March 17, 1970    J. S. ELBOGEN ETAL    3,500,864
HYDRANT PRESSURE REGULATOR

Original Filed Feb. 2, 1961    4 Sheets-Sheet 1

INVENTORS
JAMES S. ELBOGEN
WILLIAM SEILER, JR.
RALPH H. LEBOW
BY
ATTORNEYS

March 17, 1970 J. S. ELBOGEN ETAL 3,500,864
HYDRANT PRESSURE REGULATOR
Original Filed Feb. 2, 1961 4 Sheets-Sheet 3

INVENTORS
JAMES S. ELBOGEN
WILLIAM SEILER, JR.
RALPH H. LEBOW
BY Mason, Porter, Diller & Brown
ATTORNEYS INVENTORS
JAMES S. ELBOGEN
WILLIAM SEILER JR.
RALPH H. LEBOW
BY Mason, Porter, Diller & Brown
ATTORNEYS

United States Patent Office 3,500,864
Patented Mar. 17, 1970

3,500,864
HYDRANT PRESSURE REGULATOR
James S. Elbogen, Encino, William Seiler, Jr., Los Angeles, and Ralph H. Lebow, Pacific Palisades, Calif., assignors to Parker-Hannifin Corporation, Cleveland, Ohio, a corporation of Ohio
Original application Feb. 2, 1961, Ser. No. 86,740, now Patent No. 3,286,725, dated June 12, 1964. Divided and this application Sept. 19, 1966, Ser. No. 608,236
Int. Cl. B67d 5/04, 5/34; F16k 17/32
U.S. Cl. 137—614.19           4 Claims

ABSTRACT OF THE DISCLOSURE

This disclosure relates to a hydrant pressure regulator which includes the housing having positioned therein a baffle with a fluid flow passage therethrough. The baffle, in turn, supports a lower fluid pressure operated valve and an upper spring loaded poppet valve. The housing also is provided at the lower end thereof with a loosely mounted sleeve defining an annular passage between it and the housing and which sleeve has an upper portion forming a seat for the fluid pressure operated valve.

---

This is a division of our copending application Ser. No. 86,740, filed Feb. 2, 1961, now Patent No. 3,286,725.

This invention relates to pressure regulators and more particularly to pressure regulators having a main fluid pressure operated valve controlled by a pilot or servo valve. The pressure regulator herein described and claimed is particularly adaptable for use in a hydrant type fueling system for aircraft but may also be used to advantage in other fluid pressure systems in which it is desired to automatically regulate the pressure of fluid supplied from one part of the system to another.

It is an object of the invention to provide a pressure regulator which will respond quickly to a sudden increase in downstream pressure for throttling or closing the supply line, as may be required.

It is another object to provide a servo controlled pressure regulator valve in which an additional servo valve is utilized to permit faster closing of the main valve upon sudden increase in downstream pressure.

It is another object to provide a servo controlled regulator in which additional fluid from the supply line may be directed through a second servo valve to the rear of the main valve for fast closing of the latter, and in which the second servo valve when closed is substantially balanced against pressure of fluid in the supply line.

It is another object to provide a servo controlled pressure regulator valve in which the servo valve responds to a differential between the regulated downstream pressure and a separately controlled source of pressure for controlling opening and closing of the main valve.

It is another object to provide a main housing for a pressure regulator valve in which the housing is closed at its inlet end by a fluid pressure operated valve and in which a valve operable by external means is provided at the outlet end of said housing.

Figure 1:
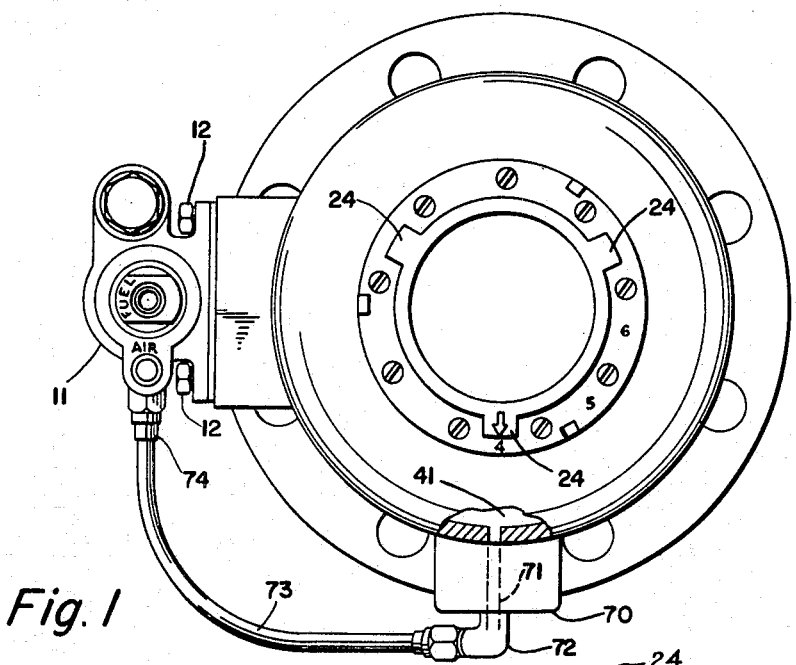
Figure 2:
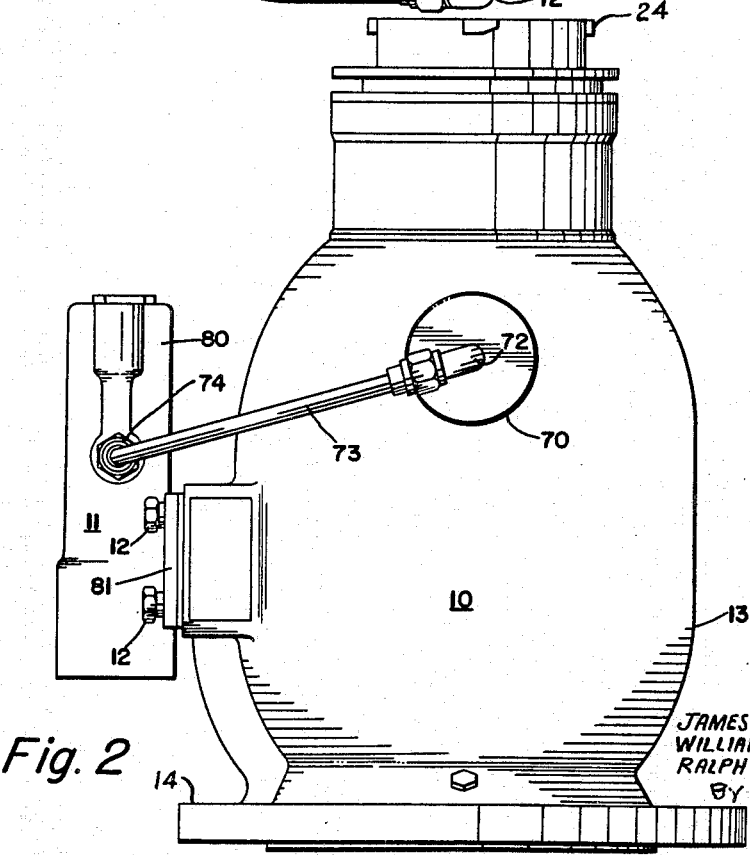
Figure 3:
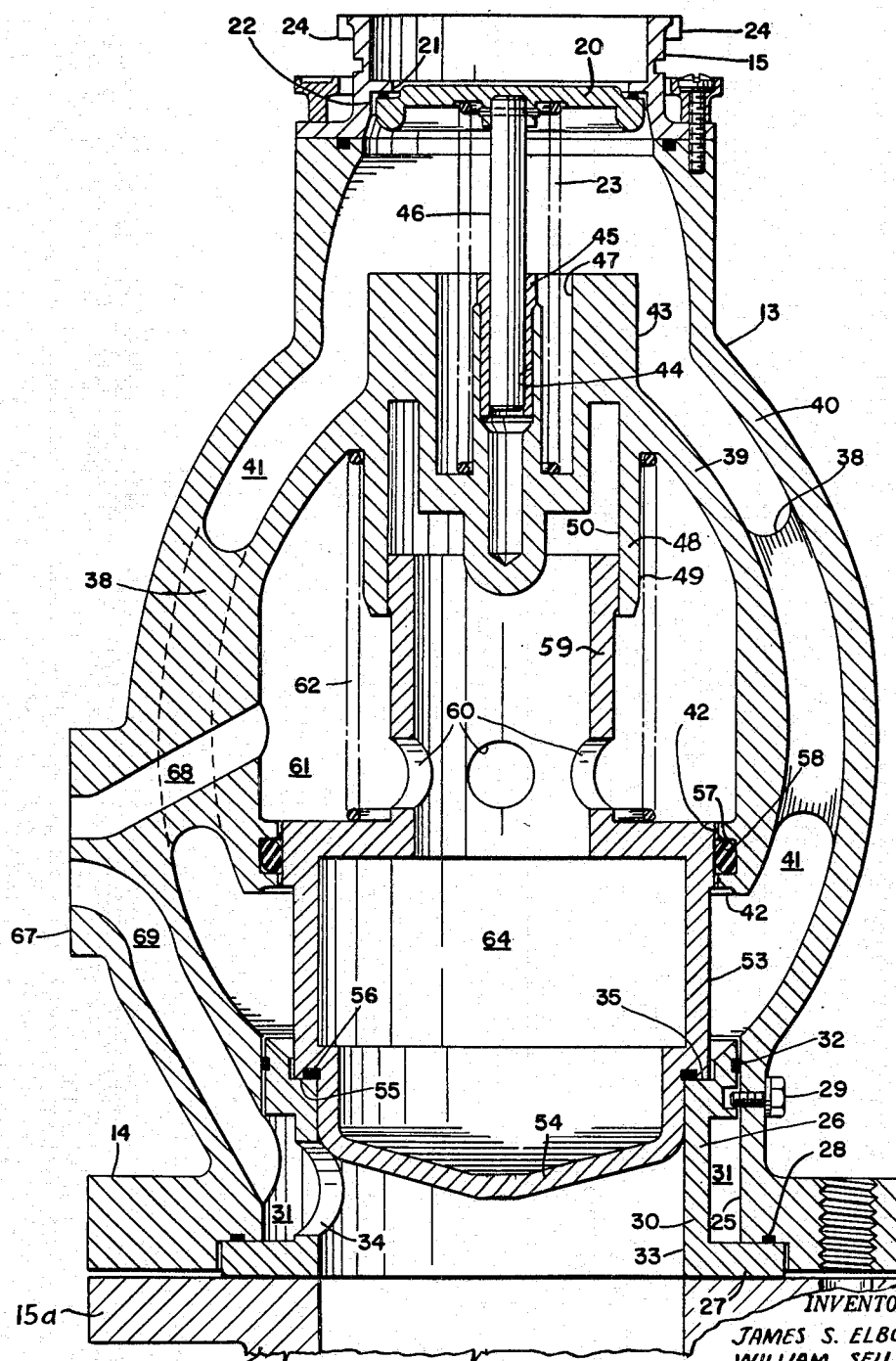
Figure 4:
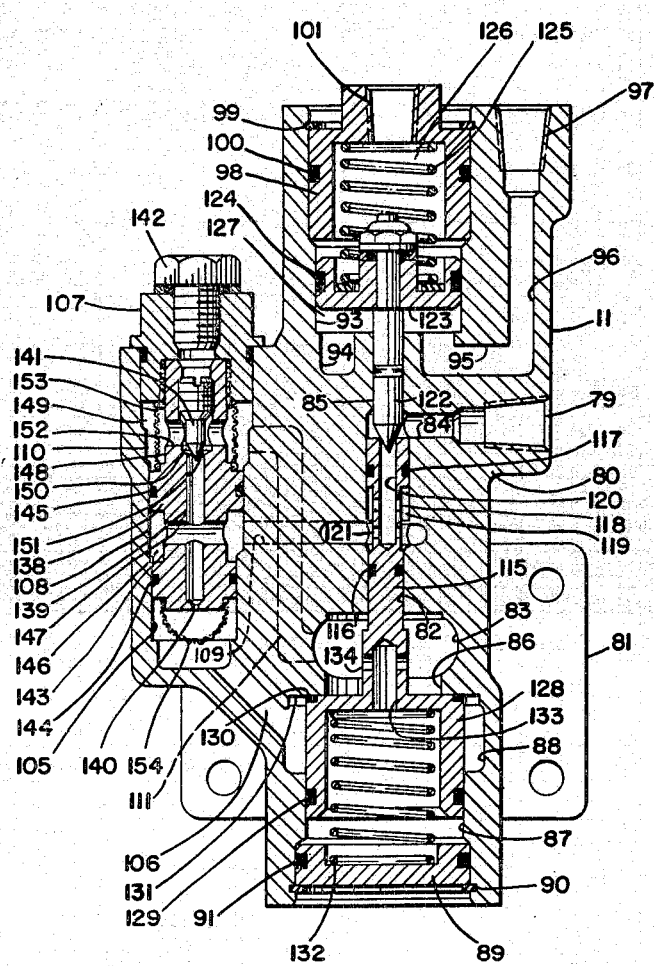
Figure 5:
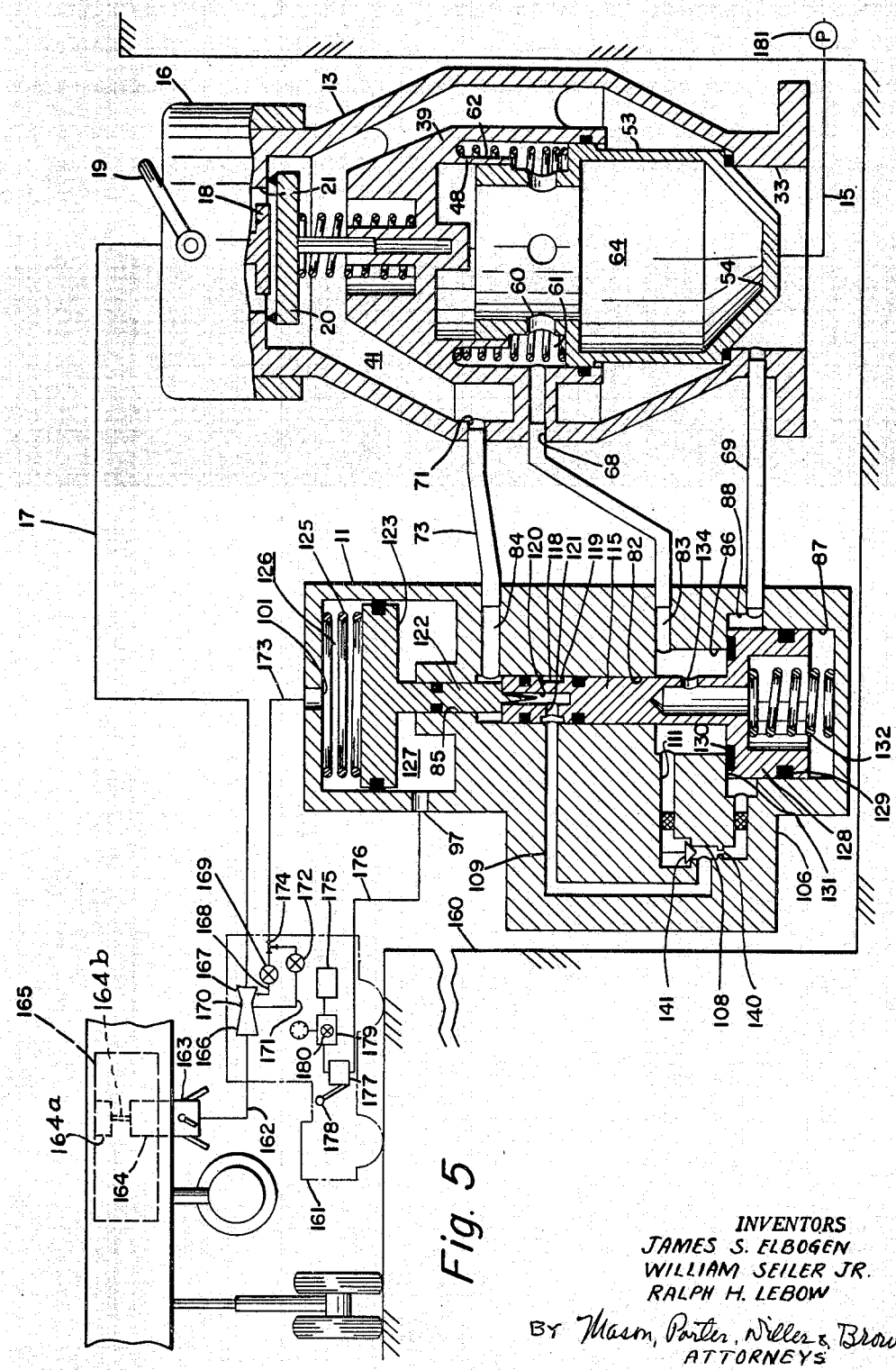

Other objects of the invention will be apparent from the following description and from the drawings in which:

FIG. 1 is a plan view of the pressure regulator.
FIG. 2 is a side elevation of the same.
FIG. 3 is a cross section view of the main valve.
FIG. 4 is a cross section of the pilot or servo valve for controlling the main valve, and
FIG. 5 illustrates a typical use of the pressure regulator in a hydrant refueling system for aircraft and showing the main and servo valves schematically.

The pressure regulator includes a main valve section generally designated 10 and a pilot or servo valve generally designated 11, the two being attached to each other by means of bolts 12.

Main valve 10 includes a housing 13 having a flange 14 at one end thereof for attachment to a source of fluid supply. At the other end it has attached to it an adaptor fitting 15 for connection to a coupler schematically illustrated at 16 in FIG. 5, bayonet lugs 24 being provided for this purpose. The coupler in turn may be attached to a conduit 17 through which fluid may be delivered as will later be described.

The coupler 16 may be of any suitable form but preferably is of the type shown in FIG. 2 of Davies Patent 2,630,822 and includes a coupler valve 18 for opening and closing the coupler through manual actuation of a handle 19. In such case, a poppet valve 20 is provided within housing 13 for closing outlet part 21 provided in adaptor 15 during such times that coupler valve 18 is closed. Poppet valve 20 is normally closed against seat 22 by spring 23 but may be moved to open position by coupler valve 18 when the latter is moved to open position by handle 19.

At the inlet end of main housing section 13 is a cylindrical bore 25 in which is mounted a sleeve 26. This sleeve has a flange 27 which projects slightly beyond the lower surface of flange 14 and which is clamped into seating engagement with a packing 28 when flange 14 is connected to a flange 15a of supply conduit 15b. Prior to such connection screw 29 retains sleeve 26 within bore 25. Sleeve 26 has a cylindrical portion 30 which is spaced from bore 25 so as to form an annular chamber 31 therebetween. This chamber is sealed at its upper end by packing 32 and is communicated with opening 33 of the sleeve by means of a radial opening 34. At its upper end sleeve 26 provides a valve seat 35.

Main housing section 13 is formed with a plurality of interior radial ribs 38 which supports a generally cup shaped member 39 in spaced relation with outer wall 40 of the housing so as to form an annular flow passage 41 therebetween. The latter leads from inlet opening 33 of sleeve 26 to outlet opening 21 in adaptor 15. The cup shaped member 39 has a cylindrical bore 42 at its lower end and is closed at its opposite end 43. The end 43 has a bore 44 therein for receiving a hollow sleeve 45 which serves as a guide for stem 46 of poppet valve 20. It also has a recess 47 for receiving spring 23. Near the closed end 43 of the cup shaped member 39 has a cylindrical projection 48 having an outer surface 49 and an internal guide surface 50.

Mounted within housing section 13 is a main fluid pressure operated valve member 53 having a hollow interior which is closed at one end by a wall 54 and which is open at its other end. Valve member 53 has a seat surface 55 which is preferably grooved for receiving a packing ring 56 bonded within the groove, the surface 55 and the ring 56 being engageable with seat 35.

Bore 42 has a groove 57 therein for receiving packing 58 which seals valve member 53 with respect to bore 42. The diameter of portion 53 is larger than the diameter of seal portion 56 so as to provide a differential area therebetween.

Valve member 53 has a hollow cylindrical portion 59 projecting from its upper end and receivable within bore 50 so as to be guided thereby. Radial openings 60 connect the interior of valve member 53 with the interior 61 of cup shaped member 39. A spring 62 within chamber 61 normally urges valve member 53 to closed position against seat 35.

The exterior surface of main valve section 13 has a flat portion 67 formed thereon. Surface 67 is communicated with chamber 61 by a passage 68 passing through one of the ribs 38 and is communicated with chamber 31 by a passage 69 formed in the outer wall of main housing 13.

As shown in FIG. 1, there is a boss 70 formed near the upper end of main housing section 13 and having an opening 71 therethrough connecting with passage 41. A fitting 72 is attached to boss 70 for connecting passage 71 with a tube 73 leading to a fitting 74 attached to servo valve unit 11.

Servo valve section 11 includes a housing 80 having a flange 81 adapted to be clamped against surface 67 of main valve section 13. Housing 80 has a cylindrical bore 82 therein which connects with a passage 83 at one end and with a passage 84 and a reduced bore portion 85 at its other end. Passage 84 leads to a port 79 and passage 83 extends transversely of housing 80 through flange 81 so as to connect with passage 68 when servo section 11 is attached to main housing section 13. Passage 83 also communicates with opening 86 which is concentric with bore 82 and which in turn leads to a cylindrical bore 87 having an enlarged chamber portion 88 at its upper end. Bore 87 is closed by a plug 89 held in place by a snap ring 90 and sealed by packing 91.

Reduced bore portion 85 leads to a cylindrical bore 93 which connects with a recess 94 at its lower end and which in turn is connected by passages 95 and 96 with a port 97. Bore 93 is closed by a plug 98 held in place by a snap ring 99 and sealed by packing 100. Plug 98 has a port 101 at its upper end.

Housing 80 has an additional bore 105 therein which connects at its lower end with chamber 88 by means of passage 106. The upper end of bore 105 is closed by plug 107. Bore 105 has a first enlarged portion 108 connected with bore 82 by means of passage 109 and a second enlarged portion 110 connected to passage 83 by passage 111.

Mounted in bore 82 is a stem 115 which is sealed between passages 83 and 109 by a packing 116 and which is sealed between passage 84 and 109 by a packing 117. Intermediate packings 116 and 117 the stem has a reduced diameter portion 118 forming an annular chamber 119 with bore 82. The upper end of the stem has a bore 120 extending thereinto opposite reduced portion 118 and communicating with annular chamber 119 by means of radial openings 121. Mounted within reduced bore portions 85 for opening and closing bore 120 is a needle valve 122 which has a piston 123 attached to its upper end. The piston is sealed within bore 93 by a packing 124. A spring 125 within chamber 126 above piston 123 acts upon the latter to normally urge needle valve 122 into closed position with respect to bore 120.

The lower end of stem 115 is enlarged to form a piston portion 128 slidable within bore 87 and is sealed with respect thereto by packing 129. The upper end of piston portion 128 carries a rubber-like insert 130 which serves as a valve face and seats against a transverse valve seat 131 for closing passage 86 with respect to chamber 88. Spring 132 normally urges stem 115 to an upward position with piston 128 seated against valve seat 131. Piston 128 seats on valve seat 141 on a diameter the same as, or slightly less than the outer diameter of packing 129 whereby piston 128 is substantially balanced, or slightly overbalanced in a seating direction by pressure of fluid within bores 86, 87, and 88.

Valve stem 115 towards its lower end also has a bore 133 which with cross drillings 134 connect passage 83 with bore 87 and the lower side of piston 128.

Mounted within bore 105 is a needle valve seat member 138 which is threaded to plug 107. Member 138 has a central bore 139 which communicates with the lower end of bore 105 by means of a restricted orifice 140 whose upper end is controlled by a needle valve 141 threaded into the upper end of member 138. Plug 107 has a central opening normally closed by threaded plug 142 but which plug may be removed to permit adjustment of needle valve 141. Member 138 has a reduced diameter portion 143 between packings 144 and 145 to provide an annular chamber 146 which connects with passage 109 and with bore 139 by means of radial openings 147.

Member 138 also has another reduced diameter portion 148 which provides an annular chamber 149 which connects with passage 111 and also with counterbore 150 above needle valve seat 151 by means of radial openings 152. A screen 153 is interposed between radial openings 152 and passage 111 and another screen 154 is interposed between orifice 140 and passage 106.

In a typical installation at an airport, the main valve housing 13 with the servo valve unit 11 operatively attached thereto, is permanently installed in a hydrant pit 160 at an airport with flange 14 connected to fuel supply pipe 15b. A mobile service truck 161 has provision for carrying another conduit 162 and a nozzle 163 which may be connected to a filling valve 164 in a tank 165 of an airplane. Conduits 17 and 162 may be in the form of flexible hose and are connected by means of a venturi 166. Leading from the inlet end, 167 of the venturi is a sensing conduit 168 having a needle valve 169 therein, and leading from the throat 170 of the venturi is another sensing conduit 171 having another needle valve 172 therein. Both conduits 168 and 171 connect with a conduit 173 by means of a T fitting 174 and conduit 173 is connectible to port 101 of servo valve unit 11.

Truck 161 also carries a source of air under pressure 175 which may be connected to port 97 of servo valve unit 11 by means of a conduit 176. Interposed in conduit 176 is a dead man valve 177 operable to on and off positions by a handle 178, and also a pressure regulator valve 179 having an adjusting means 180 for setting the pressure in conduit 176 to a predetermined value.

When it is desired to transfer fuel from a supply pipe 15 to airplane tank 165, truck 161 is brought into position near hydrant pit 160 and the airplane, nozzle 163 is connected to tank filling valve 164, coupler 16 is connected to adaptor 15 of main valve section 13 and conduits 173 and 176 are connected to ports 101 and 97, respectively.

Venturi tube 166 is for the purpose of compensating for the pressure drop in conduit section 162 and nozzles 163 so that the pressure of fluid in sensing line 173 and hence in chamber 126 will reflect the pressure in nozzle 163. This is a safeguard to prevent fluid from entering tank 165 at a pressure high enough to cause damage thereto.

Pressure regulator 129 is then set to the desired fluid pressure to be delivered through nozzle 163. Nozzle 16 is then opened by manual turning of handle 19. This causes nozzle poppet valve 18 to move downward and unseat poppet valve 20. Nozzle 163 is similarly opened by manual operation and such opening causes adaptor valve 164 to open.

Supply pump 181 is then turned on to deliver fluid from a tank, not shown, through line 15b to inlet port 33 of main valve section 13. At this time, main valve 53 is closed due to the action of spring 61, needle valve 122 is closed by spring 125, and piston 128 is seated on seat 131 by spring 132. Fluid in inlet port 33 passes through openings 34, passage 69, chamber 88, passage 106, orifice 140, needle valve 141, passage 111 and passage 68 into chamber 61. Since needle valve 122 is closed, the fluid is trapped within chamber 61 and interior 64 of valve 53 and exerts a downward pressure on valve element 53, on a greater area than fluid within in inlet port 33 acts upwardly on the valve element to hold valve element 53 closed.

To start the flow of fluid, the operator manipulates handle 178 to open valve 177 to permit air under pressure from supply unit 175 to be delivered at the desired regulated pressure to chamber 127. This causes piston 123 and needle valve 122 to raise and open port 120 to connect it with passage 84 which in turn is connected through tube 73 with chamber 41 and the outlet or downstream end of main section 13. Opening of needle valve 122 in the manner just described permits fluid to exhaust from chamber 61 and the interior of the valve element 53 by means of passages 68, 83, 111, needle valve 141, passages 109, 121, 120, needle valve 122, passage 84, tube 73, passage 71, and chamber 41 to outlet port 21. These passages and needle valve openings permit greater flow than orifice 140 and therefore fluid will exhaust from chamber 61 and the interior of valve element 53 faster than it may enter and thus reduce downward pressure on valve element 53 so that the latter moves upwardly to open position by reason of the fluid pressure within inlet port 33. This permits flow from port 33 past valve seat 35 into chamber 41 and through port 21, coupler 16, conduits 17 and 162, and nozzle 163 into tank 165.

As delivery pressure builds up in conduit 17 and venturi 166, the pressures within venturi 166 are transmitted through lines 168 and 171 and produce an intermediate pressure in line 173 and hence in chamber 101. As the pressure in chamber 101 approaches the desired regulated pressure as predetermined by pressure regulator 179, piston 123 and needle valve 122 are forced downward to throttle the exhaust flow from chamber 61 through port 120. This causes pressure within chamber 61 and the interior of valve element 53 to build up and start closing movement of valve element 53 with consequent throttling of the flow through main housing 13 to tank 165. At some point of throttled flow the pressure in chamber 126 will counterbalance the fixed air pressure within chamber 127 to stabilize the position of needle valve 122 and valve 53 so as to maintain the desired regulated delivery pressure at nozzle 163.

Although the fluid pressure in chamber 126 is adjusted to represent that at nozzle 163, it may also be considered as representing the fluid pressure at outlet 21 of the main valve since the latter pressure is equal to the fluid pressure at nozzle 163, plus the pressure drop occurring between nozzle 163 and outlet 21. Thus it can be considered that the fluid pressure at outlet 21 is regulated, as well as the fluid pressure at nozzle 163.

When tank 165 is full, flow thereinto may be stopped by automatic closing of valve 164 by action of the float operated pilot valve 164a. At this time, pressure rise of fluid between regulator valve 13 and filling valve 164 is prevented by closing of valve element 53. Thus when valve 164 has closed, the pressure at nozzle 163 will tend to increase which in turn will cause an increase of pressure in chamber 126. This causes needle valve 122 to close passage 120 and thereby cutting off the exhausting of fluid from chamber 61. Fluid passing from inlet 33 through orifiec 140 raises the fluid pressure within chamber 61 and in the interior of valve 53 and causes complete closure of valve element 53.

Valve 177 is in the nature of a "dead man" control in that it must be manually held to an open position in order for the fueling operation to continue. If it is desired to discontinue fueling before tank 165 is full, handle 178 may be relased by the operator to cause valve 177 to close. This drops the pressure within chamber 127 to permit pressure in chamber 126 and spring 125 to move needle valve 122 to its closed position. This results in closing of main valve 53 as already described. To avoid pressure being trapped in chamber 127 upon closing of valve 177, a port may be provided in valve 177 for connecting line 176 to atmosphere upon closing of valve 177. In other words, valve 177 may be a three way valve which in one position connects pressure source 175 to chamber 126 and in another position closes off pressure source 175 and connects chamber 126 to exhaust.

Piston valve 128 serves as a means for directing fluid from inlet port 33 to chamber 61 for rapidly filling the same to quickly close main valve 53 upon closing of needle valve 122 due to closing of tank valve 164, as above described or upon a sudden increase in the delivery pressure at tank 165. In either case the increase of pressure at tank 165 will be reflected back through nozzle 163 and line 162 to venturi 166 where it will cause a rapid increase of pressure in line 173 and chamber 101. This will cause needle valve 122 to move to closed position and then to continue to move downward, carrying stem 115 with it, to unseat piston valve 128 from seat 131. Upon unseating of the latter, fluid from inlet port 33 will pass through openings 34, chamber 31, passages 69, 88, 86, 83, and 68 to chamber 61 where it will rapidly fill the latter and the interior of valve element 53 and cause the valve element to close quickly.

Needle valve 141 is provided for adjusting the rate at which valve element 53 opens. In effect it is a variable orifice which may be utilized for further controlling flow of fluid which has passed through fixed orifice 140 on its way from inlet 33 to chamber 64 so as to vary the rate at which fluid is delivered to the upper side of valve 53. Thus if there has been a change in the pressure in supply pipe 15b over that for which orifice 140 has been provided, further opening or closing of needle valve 141 will increase or decrease the rate of flow to chamber 164 and correspondingly either slow down or speed up the opening movement of valve 53. Normally, the position of needle valve 141 is adjusted at the factory or upon initial installation of the hydrant regulator. Adjustment may be made by removing plug 142, turning the needle valve with a screw driver, after which plug 142 may be replaced.

We claim:

1. A valve comprising a housing having a fluid passage therethrough and a fluid pressure operated main valve for opening and closing said passage, a pressure chamber in said housing for receiving fluid for applying a closing pressure to said main valve, said housing having a bore at the inlet end of said passage, a hollow sleeve mounted in said bore, the interior of said sleeve constituting a part of said passage through said housing, said sleeve having at its inner end a seat for said main valve, said sleeve having a portion radially spaced from said bore to provide an annular chamber therebetween, passage means communicating the interior of the sleeve with said annular chamber, and another passage means connecting said annular chamber with said pressure chamber whereby fluid from said inlet end of said housing may be directed to said pressure chamber for closing said main valve, and means for exhausting fluid from said pressure chamber to permit said main valve to be opened by pressure of fluid within said sleeve, said housing and sleeve having engageable opposed lateral abutments, said sleeve having another lateral surface projecting axially beyond said housing for engagement with a supply conduit to which said housing may be coupled, means for loosely mounting said sleeve within said bore for limited axial movement therein whereby engagement of said lateral surface with said supply conduit will cause tight engagement of said lateral abutments.

2. In combination, a main housing having an inlet and an outlet and a flow passage therebetween, a fluid pressure operated valve in said housing for opening and closing said inlet, and a one way valve in said housing normally closing said outlet port, said one way valve being adapted to be opened by an operator insertable within said outlet port, said housing having an integral baffle including axially spaced upper and lower portions, a flow passage in said housing from said inlet and said outlet around said baffle, and said fluid pressure operated valve including a lower piston-like portion guided for axial movement by and in sealed engagement with said baffle lower portion, said fluid pressure operated valve also having a tubular upper portion guided for axial movement by said baffle upper portion, said fluid pressure operated valve being urged towards a closed position by a spring telescoped over said tubular upper portion and having the ends thereof compressively engaging said baffle upper portion and said lower piston-like portion with said being disposed entirely outside of said fluid pressure operated valve and within said baffle.

3. The valve of claim 1 wherein said sleeve is loosely retained in said housing by a releasable fastener loosely received in a recess in said sleeve.

4. The valve of claim 1 wherein an annular sealing member is positioned between said sleeve and housing lateral surfaces, and a circumferential seal is disposed between an upper end portion of said sleeve and said housing.

References Cited

UNITED STATES PATENTS 2,943,636  7/1960  Reed _____ 137—220

FOREIGN PATENTS 1,143,928  10/1957  France.

WILLIAM F. O'DEA, Primary Examiner

H. M. COHN, Assistant Examiner

U.S. Cl. X.R.

137—220